US012337454B2

(12) United States Patent
Yoshikane et al.

(10) Patent No.: US 12,337,454 B2
(45) Date of Patent: Jun. 24, 2025

(54) DRIVING TOOL

(71) Applicant: MAKITA CORPORATION, Anjo (JP)

(72) Inventors: Kiyonobu Yoshikane, Anjo (JP); Makito Teramoto, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/660,500

(22) Filed: May 10, 2024

(65) Prior Publication Data

US 2025/0010445 A1 Jan. 9, 2025

(30) Foreign Application Priority Data

Jul. 7, 2023 (JP) ................................ 2023-112032

(51) Int. Cl.

*B25C 1/00* (2006.01)
*B25C 5/13* (2006.01)
*B25C 5/16* (2006.01)

(52) U.S. Cl.

CPC .............. *B25C 5/1617* (2013.01); *B25C 5/13* (2013.01); *B25C 5/1637* (2013.01); *B25C 5/1665* (2013.01)

(58) Field of Classification Search

CPC .... B25C 5/16; B25C 1/00; B25C 1/06; B25C 5/1617; B25C 5/15; B25C 5/11; B25C 1/047; B25C 1/008; B25C 1/005; B25C 5/06; B25C 5/13; B25C 5/0207; B25C 1/001; B25C 5/1696

USPC ....... 227/120, 126, 127, 136, 155, 129, 130, 227/123, 125, 109, 131, 113, 128, 87, 227/116

See application file for complete search history.

(56) References Cited

U.S. PATENT DOCUMENTS

2004/0084499 A1* 5/2004 Tsai ........................ B25C 1/005 227/123
2021/0404647 A1* 12/2021 Ishikawa .................. B25C 7/00
2022/0226978 A1* 7/2022 Nettleton ................ B25C 5/162

FOREIGN PATENT DOCUMENTS

JP 5125844 B2 1/2013

* cited by examiner

*Primary Examiner* — Jacob A Smith
(74) *Attorney, Agent, or Firm* — Oliff PLC

(57) ABSTRACT

A driving tool comprises a tool main body that includes a driver for driving a U-shaped staple, and a main magazine for housing a plurality of staples that extends from the tool main body. The driving tool also comprises a sub-magazine to which a pusher and a staple guide are attachable. The pusher pushes the staples in the main magazine toward the tool main body. The staple guide is inserted between a pair of legs of the staple in the main magazine. The driving tool also comprises a guide mechanism for guiding the sub-magazine toward the tool main body from an opening position to a closing position with respect to the main magazine. The guide mechanism also guides the sub-magazine in a direction opposite to a driving direction while the sub-magazine moves from the opening position to the closing position.

20 Claims, 13 Drawing Sheets

DRIVING TOOL

CROSS-REFERENCE TO RELATED APPLICATION

This application claims priority to Japanese patent application serial number 2023-112032, filed on Jul. 7, 2023, the contents of which are incorporated herein by reference in their entirety for all purposes.

TECHNICAL FIELD

The present invention generally relates to a driving tool for driving a driving member, such as a nail or a staple, into a workpiece, such as, for example, a wooden material.

BACKGROUND

A gas-spring type driving tool that utilizes a thrust power of compressed air as a driving force for driving a driving member is known. For example, a staple is used as the driving member. The staple is formed in a U-shape, having a linear bar-shaped head and a pair of legs each of which extends from an end of the head in a direction approximately perpendicular to the head. The driving tool includes a driver for driving a staple and a driving passage within which the driver moves. The staple is loaded into the driving passage individually in a state where the pair of legs face in a driving direction and the head faces in a direction opposite to the driving direction. The driver drives the head of the staple in the driving direction, which is loaded into the driving passage. The staple driven by the driver is ejected from an ejection port of the driving tool into a workpiece such that the pair of legs faces the workpiece.

The driving tool is provided with a magazine that houses a plurality of staples. The magazine includes a pusher that biases the plurality of staples toward the driving passage. The magazine also includes an approximately box-shaped main magazine that houses the plurality of staples. The magazine also includes a staple guide that enters between the pair of legs of the staple in the magazine. The staple guide is linked to the pusher to form a sub-magazine. The main magazine includes an opening of the main magazine in the driving direction and a back surface in a direction opposite to the driving direction on an innermost portion of the main magazine. The plurality of staples temporary bonded to each other are housed in the magazine such that heads of the plurality of stales are arranged along the back surface. The heads of the plurality of staples are held between the back surface of the main magazine and an end surface of the staple guide on a side opposite to the driving direction. The sub-magazine is formed integrally with a magazine end that opens/closes the opening of the main magazine. The magazine end slides parallel to a direction in which the plurality of staples are pushed by the pusher. The staple guide slides together with the magazine end.

When the staples are loaded in the main magazine, it may often happen that the staples are tilted within the magazine. For example, when there are few staples in the magazine, there is a tendency that the staples are tilted in a direction toward the driving passage as the legs of the staples extend in the driving direction. Furthermore, when the staples are tilted, the heads of the staples sometimes enter an area within which the staple guide is able to slide. A clearance between the staple guide and the head of the staple is configured to be as small as possible in order to reduce rattling of the staples within the main magazine. Therefore, a slight tilt of the staple may cause the head of the staple to interfere with the staple guide that causes the magazine end not to be closed completely. Further, when there are few staples remaining in the magazine, it is difficult to keep the staples from being tilted within the magazine.

Thus, there is a need for an improvement of the driving tool that prevents an interference between the staple guide and the staples when the U-shaped staples are loaded into the main magazine.

SUMMARY OF THE DISCLOSURES

According to one aspect of the present disclosure, a driving tool has a tool main body including a drive configured to drive a U-shaped staple having a head and a pair of legs in a driving direction. The driving tool also has a main magazine for housing one or more staples, and the main magazine extends from the tool main body. The driving tool also has a pusher configured to push the plurality of staples in the magazine toward the tool main body. The driving tool further has a staple guide to be inserted between the pair of legs of the staple in the main magazine. The driving tool has a sub-magazine to which the pusher and the staple guide are attachable. The driving tool also has a guide mechanism for guiding the sub-magazine from an opening position with respect to the main magazine toward the tool main body to a closing position. Also, the guide mechanism is configured to guide the sub-magazine in a direction opposite to the driving direction while the sub-magazine moves from the opening position to the closing position.

Because of these configuration, the staple guide that is remotely from the closing position is relatively positioned on a side of the driving direction (a lower side) in comparison to the staple guide being adjacent to the closing position. Accordingly, when the sub-magazine moves away from the closing position, a clearance can be formed between the tip end of the staple, which is on a side of a direction opposite to the driving direction, and the head of the staple in the main magazine. Thus, if the staple is slightly tilted in a loading direction, an interference of the staple guide with the head of the staple can be prevented. Accordingly, in the guide mechanism, the staple guide can be moved to the closing position so as not to interfere with the staple. When the sub-magazine moves closely to the closing position, the tip end of the staple guide, which is on a side of a direction opposite to the driving direction, approaches the head of the staple in the main magazine. Accordingly, rattling of the staples in the magazine can be reduced by moving the sub-magazine toward the closing position.

DETAILED DESCRIPTION

Figure 1:
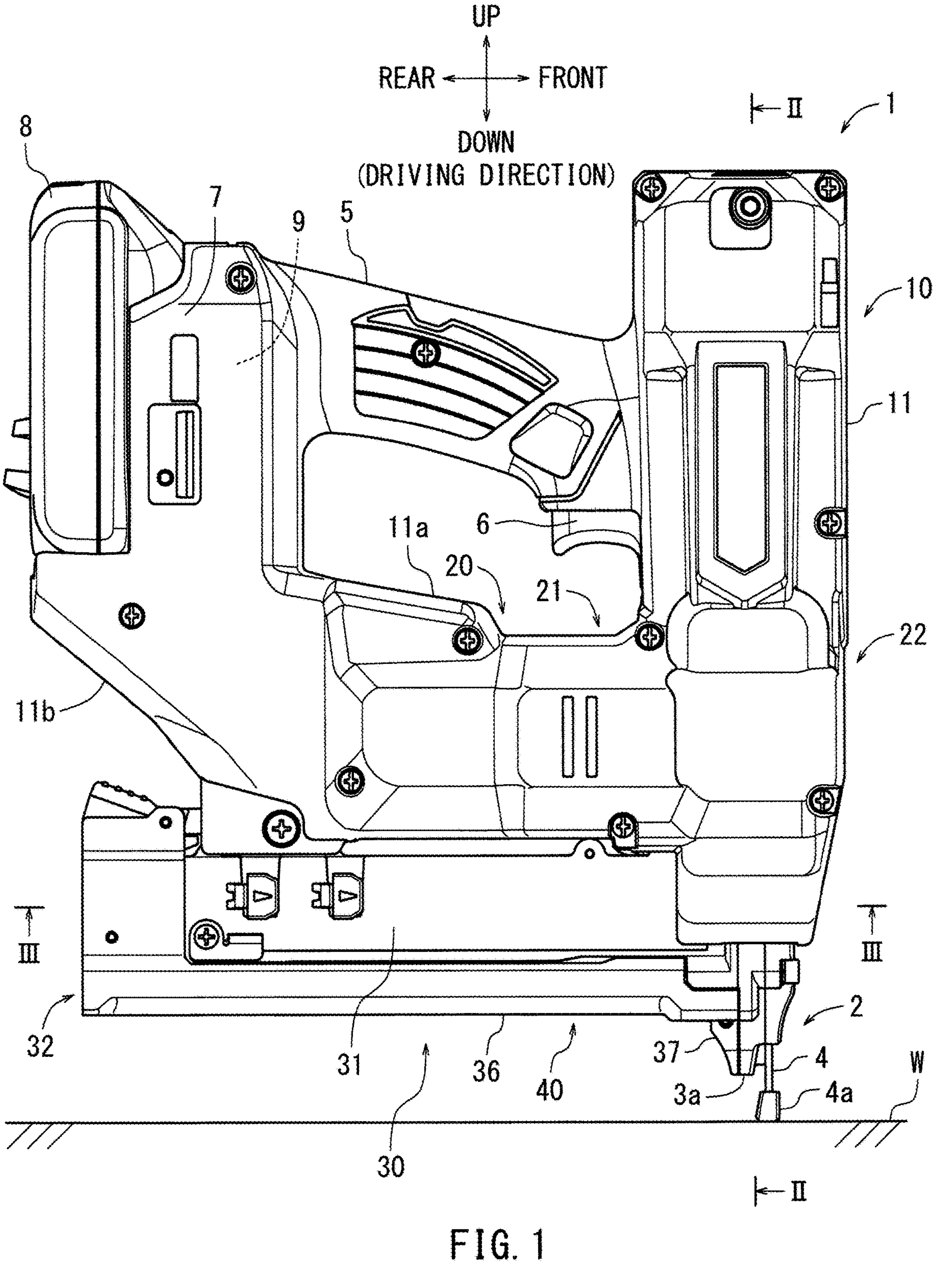
FIG. 1 is a right side view of a driving tool according to an embodiment of the present disclosure.

The detailed description set forth below, when considered with the appended drawings, is intended to be a description of exemplary embodiments of the present disclosure and is not intended to be restrictive and/or representative of the only embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the disclosure. It will be apparent to those skilled in the art that the exemplary embodiments of the disclosure may be practiced without these specific details. In some instances, these specific details refer to well-known structures, components, and/or devices that are shown in block diagram form in order to avoid obscuring significant aspects of the exemplary embodiments presented herein.

According to one aspect of the present disclosure, the guide mechanism includes (i) a rail formed on either one of the main magazine and the sub-magazine, and (ii) a rail engaging portion that slidably engages the rail and is formed on the other one of the main magazine and the sub-magazine. Because of this configuration, a movement of the sub-magazine with respect to the main magazine can be properly and reliably guided by the rail and the rail engaging portion. When the sub-magazine is at the opening position, the staple guide can be reliably guided such that the staple guide is away from the head of the staple on a side of the driving direction. When the sub-magazine is at the closing position, the staple guide can be reliably guided such that the staple guide approaches the head of the staple on a side of the direction opposite to the driving direction. Therefore, when the sub-magazine is closed, an interference of the staple guide with the head of the staple can be prevented and also rattling of the staples in the magazine can be reduced.

According to another aspect of the present disclosure, the rail includes (i) a first rail linearly extending toward the tool main body, and (ii) a second rail extending from an end of the first rail so as to be tilted in the direction opposite to the driving direction. Because of this configuration, when the rail engaging portion engages the first rail and the sub-magazine is away from the closing position, the staple guide is retained so as not to move on a side of the direction opposite to the driving direction, i.e., upward. When the sub-magazine approaches the closing position and the rail engaging portion engages the second rail, the staple guide moves on the side of the direction opposite to the driving direction. Accordingly, an interference of the staple guide with the head of the staple can be prevented until the sub-magazine moves close to the closing position. Because of this configuration, for example, in a case where there are not so many connected staples in the main magazine and the rear end staple farthest from the tool main body is disposed relatively close to the tool main body, an interference of the staple guide with the head of the staple can be prevented.

According to another aspect of the present disclosure, the rail further includes a third rail that extends from an end of the second rail toward the tool main body so as to be tilted relative to the second rail and parallel to the first rail. While the rail engaging portion engages the third rail, the staple guide moves parallel to a feeding direction of the staples. Also, when the rail engaging portion engages the second rail, the staple guide approaches the head of the staple. Accordingly, while the sub-magazine moves toward the closing position (refer to FIG. 7), the staple guide can be guided smoothly toward the tool main body with rattling of the staple being reduced.

According to another aspect of the present disclosure, the main magazine includes a back surface that faces the heads of the staples in the magazine. The back surface includes a flank relief that is formed on a side of the tool main body to form a clearance between the sub-magazine and the flank relief in the driving direction. Because of this configuration, when there are not so many connected staples in the main magazine or when the staples are tilted in the main magazine, the clearance is created between the head of the staple and the staple guide which moves close to the closing position owing to the presence of the flank relief of the back surface. Accordingly, the sub-magazine can be smoothly moved to the closing position.

According to another aspect of the present disclosure, the flank relief is a flat surface that is tilted in the direction opposite to the driving direction when the flank relief approaches the tool main body. The staple guide thus moves in a direction opposite to the driving direction (i.e. upward) when the staple guide moves toward the closing position. By aligning a tilting direction of the flank relief with a moving direction of the staple guide in the up-down direction, a clearance between the staple guide and the head of the staple can be obtained. Thus, the sub-magazine can be reliably moved to the closing position.

According to another aspect of the present disclosure, the main magazine includes the rail, and the flank relief that extends from a start position to the tool main body. The start position is positioned remotely from the tool main body that is farther than the end of the first rail. When the sub-magazine moves to the closing position, the staple guide approaches the head of the staple in a direction opposite to the driving direction. The flank relief forms a clearance by which the staples are directed in a direction opposite to the driving direction earlier than an upward movement of the staple guide toward the head of the staple. This configuration prevents an interference of the staple guide with the head of the staple when the sub-magazine moves to the closing position.

According to another aspect of the present disclosure, a depth of the flank relief in the driving direction is smaller than a moving distance of the sub-magazine of the guide mechanism in the driving direction. Because of this configuration, the clearance between the staple guide and the head of the staple is gradually reduced as the sub-magazine moves toward the closing position. Accordingly, when the sub-magazine moves to the closing position, rattling of the staples in the main magazine can be reduced.

According to another aspect of the present disclosure, the pusher is positioned in the sub-magazine farther away from the tool main body than a tip end of the staple guide.

Because of this configuration, when the sub-magazine moves to the closing position, the staple guide enters between the pair of legs before the pusher contacts the staple. Accordingly, for example, if the staple is tilted by being pushed by the pusher, the tip end of the staple guide has already been positioned so as not to interfere with the head of the staple. Thus, an interference of the staple guide with the head of the staple can be prevented.

According to another aspect of the present disclosure, when the driver is at a standby position, each staple in the main magazine is arranged to be tilted so as to approach the driving passage of the tool main body as extending from the head to the pair of legs. Because of this configuration, the heads of the staples arranged in the main magazine in the front-rear direction are tilted in a direction opposite to the driving direction (i.e., upward) as the staples approach the tool main body. Accordingly, with regard to the staples that are tilted in the main magazine, a clearance can be obtained between the staple guide and the head of the staple to prevent an interference of the staple guide with the head of the staple.

An embodiment according to the present disclosure will be explained with reference to FIGS. 1 to 13. FIG. 1 shows an example of a driving tool 1, e.g., a gas-spring type driving tool 1 that utilizes a pressure of a gas filled in an accumulation chamber as a thrust power for driving a driving member. In the following explanation, a driving direction of the driving member is a downward direction, and a direction opposite to the driving direction is an upward direction. In FIG. 1, a user of the driving tool 1 is generally situated on a rear side of the driving tool 1. The rear side of the driving tool 1 is also referred to as a user side, and a side in a forward direction is referred to as a front side. Also, a left and right side is based on a user's position.

Figure 2:
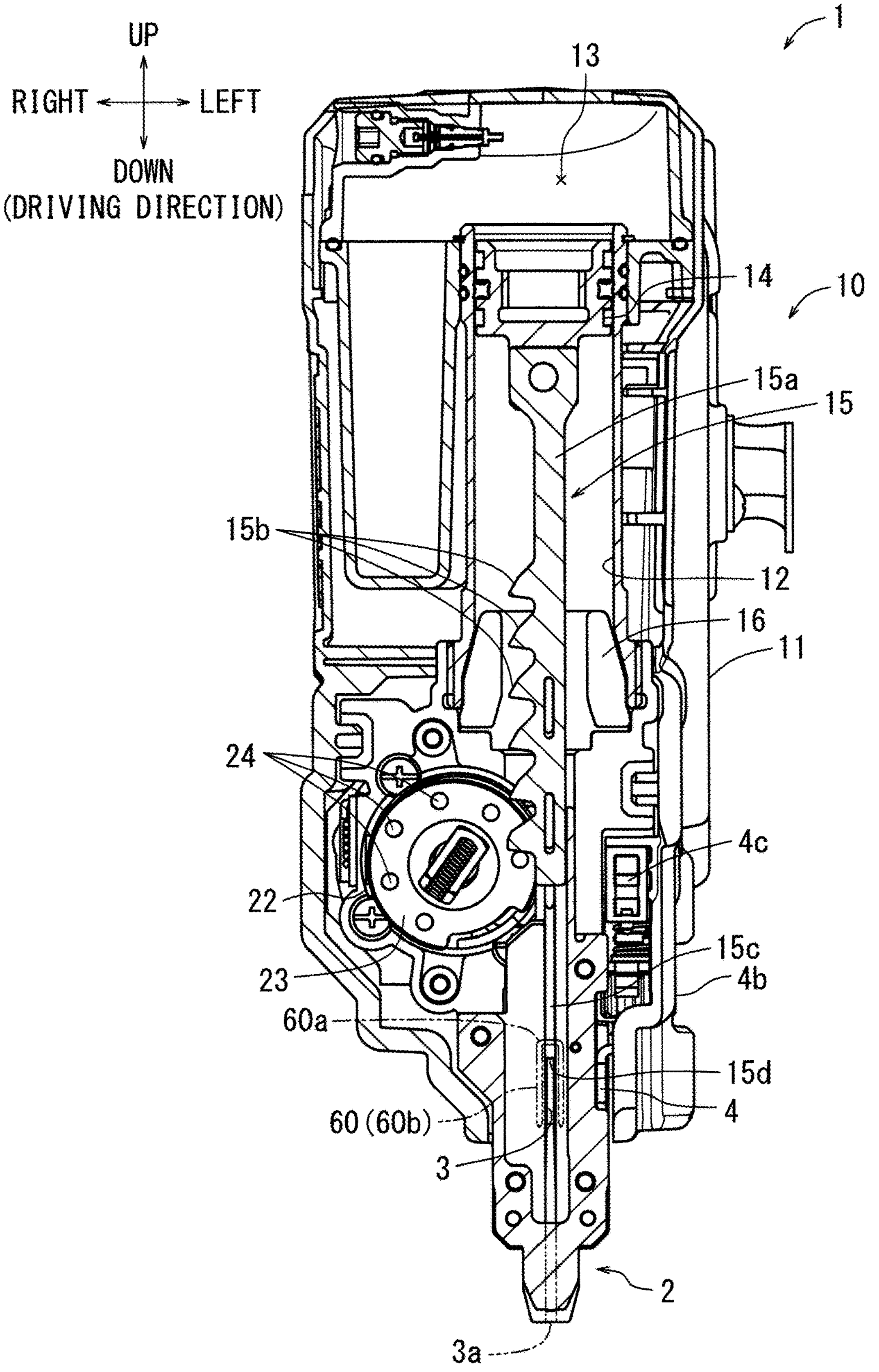
FIG. 2 is a cross-sectional view taken along line II-II of FIG. 1.

As shown in FIG. 2, the driving tool 1 includes a tool main body 10. The tool main body 10 includes a cylinder 12 that is housed in a tubular main body housing 11. A piston 14 is housed within the cylinder 12, so as to be able to reciprocate in an up-down direction. An upper portion of the cylinder 12 that is above the piston 14 communicates with an accumulation chamber 13. A compression gas such as, for example, air, is filled in the accumulation chamber 13. A pressure of a gas filled in the accumulation chamber 13 acts on an upper surface of the piston 14, thereby providing a thrust power for a driving operation. A damper 16 for absorbing an impact of the piston 14 at a bottom dead center is arranged on a lower side of the cylinder 12.

Figure 8:
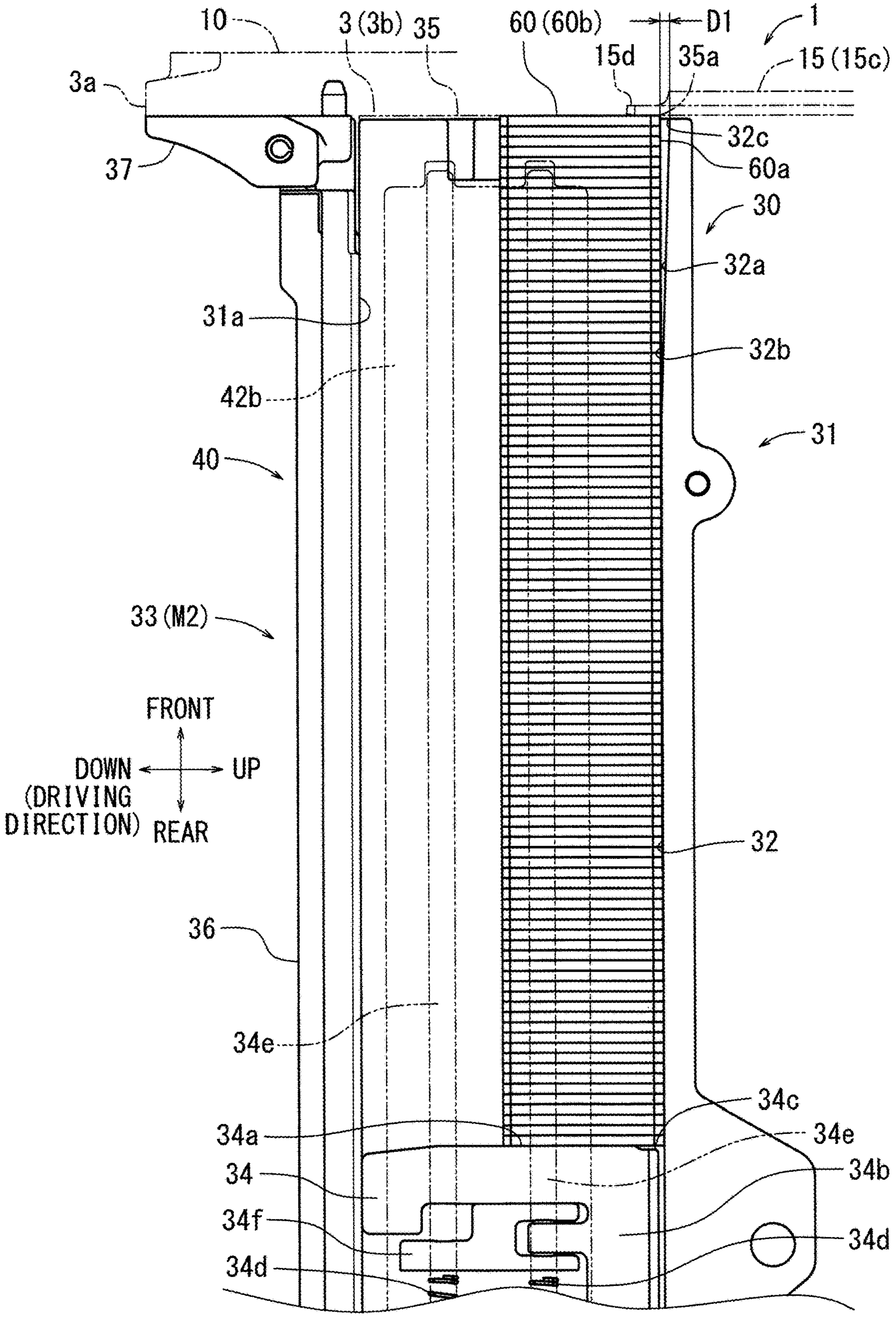
FIG. 8 is a cross-sectional view taken along line VIII-VIII of FIG. 6.
Figure 9:
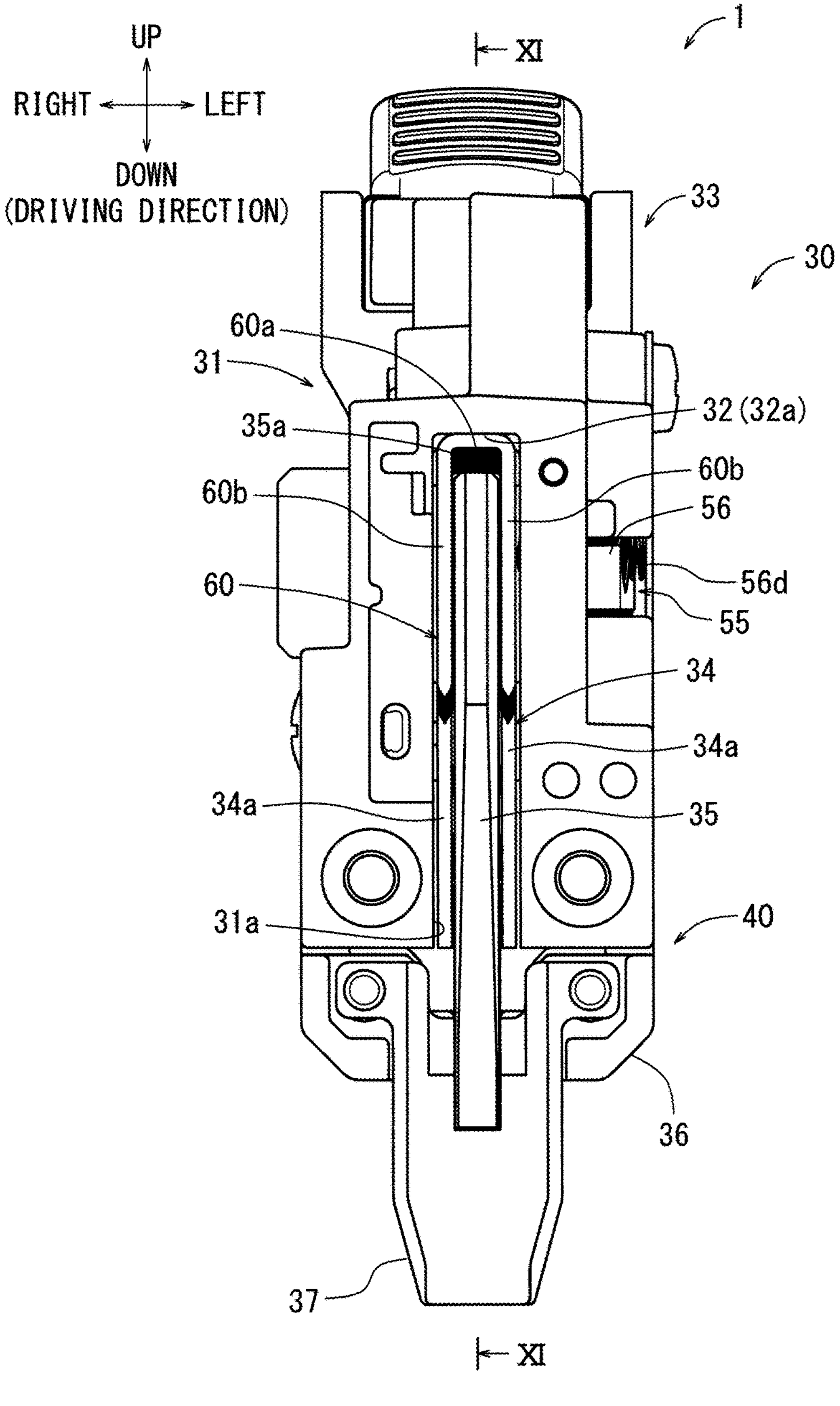
FIG. 9 is a front view of the sub-magazine when the sub-magazine is open.

As shown in FIGS. 1 and 2, a lower portion of the tool main body 10 includes a driving nose 2. The driving nose 2 includes a driving passage 3. The driving passage 3 extends in an up-down direction within the tool main body 10. The driving passage 3 communicates with a lower portion of the cylinder 12. A magazine 30 within which staples 60 are loaded is linked to a rear portion of the driving nose 2. A plurality of staples 60 is loaded within the magazine 30 such that each of the plurality of staples 60 extends in the up-down direction and are arranged in parallel in a front-rear direction. As shown in FIG. 8, adjacent staples 60 are bonded to each other.

As shown in FIG. 2, the staple 60 is a U-shaped staple. The staple 60 includes a bar-shaped head 60*a* extending in a left-right direction and a pair of legs 60*b*. Each of the pair of legs 60*b* extends from an end of the head 60*a* in a direction approximately perpendicular to the head 60*a*. The staple 60 is housed in the magazine 30 such that the head 60*a* is on an upper side of the magazine 30 and each of the pair of legs 60*b* extends downward. The staples 60 are loaded into the driving passage 3 one by one from the magazine 30.

As shown in FIG. 1, a contact arm 4 is arranged at a lower portion of the driving nose 2 and is slidable in an up-down direction. The contact arm 4 is biased downward toward an off position. The contact arm 4 moves upward toward an on position against a biasing force when a tip end 4*a* of the contact arm 4 contacts and is pressed against a workpiece W.

As shown in FIG. 1, a grip 5, which is configured to be held by a user, is arranged on a rear side of the tool main body 10. A trigger 6, which is configured to be pulled by a fingertip of the user, is arranged on a lower surface of a front portion of the grip 5. A trigger switch, which is configured to be switched between an off state and an on state according to a pulling operation of the user, is arranged in the grip 5. When the contact arm 4 is pushed against the workpiece W so as to be moved to the on state, a pulling operation of the trigger 6 becomes effective.

As shown in FIG. 1, a battery attachment portion 7 is arranged on a rear side of the grip 5 and extends in the up-down direction. A battery pack 8 is detachably attached to the battery attachment portion 7. The battery pack 8 is removable from the battery attachment portion 7 for recharge by a dedicated charger. The battery pack 8 can be used as a power source for various electric tools. The battery pack 8 serves as a power source for supplying power to an electric motor 20, which is discussed in detail later.

As shown in FIG. 1, the main body housing 11 includes an approximately tubular-shaped driving unit case 11*a* and a coupling part 11*b*. The driving unit case 11*a* extends in the front-rear direction above the magazine 30. The coupling part 11*b* vertically couples the driving unit case 11*a* to the battery attachment portion 7. The grip 5, the battery attachment portion 7, the coupling part 11*b* and the driving unit case 11*a* cooperate with each other to form a loop shape. The coupling part 11*b* includes a controller 9 that is housed in a shallow box-shaped rectangular case. The controller 9 is arranged in the coupling part 11*b* so as to extend approximately in the up-down direction. The controller 9 mainly controls a drive of the electric motor 20.

As shown in FIG. 2, a driver 15 extending in the up-down direction is connected to a lower portion of the piston 14. The driver 15 includes a main body portion 15*a* and a striking portion 15*c*. The main body portion 15*a* of the driver 15 is connected to the piston 14. The striking portion 15*c* of the piston 15 is connected to the lower portion of the main body portion 15*a* of the driver 15. The striking portion 15*c* of the driver 15 extends in the up-down direction in parallel to the main body portion 15*a* of the driver 15 such that the striking portion 15*c* is behind the main body portion 15*a*. In other words, the driver 15 has a two-staged structure including the main body portion 15*a* and the striking portion 15*c* disposed in the front-rear direction. A lower portion of the striking portion 15*c* enters the driving passage 3. The driver 15 moves downward owing to a pressure of the gas filled in the accumulation chamber 13 which acts on an upper surface of the piston 14. A tip end 15*d* at a lower end of the striking portion 15*c* drives a staple 60 that has been loaded into a driving position within the driving passage 3. A staple 60 driven by the driver 15 is ejected from an ejection port 3*a* that is open at a lower end of the driving passage 3. The staple 60 ejected from the ejection port 3*a* is driven into a workpiece W.

As shown in FIG. 2, a plurality of rack teeth (engaged portions) 15*b* protruding rightward are formed on a right side of the main body portion 15*a* of the driver 15. In the present embodiment, six rack teeth 15*b* are arranged in a longitudinal direction of the main body portion 15*a* (in the up-down direction). Each of the rack teeth 15*b* is formed approximately in a triangular shape such that a bottom surface thereof is directed to (faces) a side of a driving direction, i.e., downward. The bottom surface of each of the rack teeth 15*b* engages a corresponding engaging portion 24 of the lift mechanism 22, which is discussed in detail later.

As shown in FIG. 1, the electric motor 20 serving as a driving source is housed in the driving unit case 11*a*. The electric motor 20 is housed such that a motor axis of the electric motor 20 extends in the front-rear direction. The electric motor 20 is powered by the battery pack 8 and activated by a pulling operation of the trigger 6 or any other suitable operation. A planetary gear reduction mechanism 21 is arranged on a front side of the electric motor 20. The planetary gear reduction mechanism 21 includes a three-staged planetary gear train. A lift mechanism 22 for moving the driver 15 upward is arranged in front of the planetary gear reduction mechanism 21. The electric motor 20, the planetary gear reduction mechanism 21 and the lift mechanism 22 are arranged in parallel to the motor axis of the electric motor 20. A rotation speed of the electric motor 20 is reduced by the planetary gear reduction mechanism 22 and transmitted to the lift mechanism 22.

As shown in FIG. 2, the lift mechanism 22 is arranged on a right side of the driving nose 2. The lift mechanism 22 includes a wheel 23 that is rotatable around a shaft extending in the front-rear direction. The wheel 23 is configured to be rotatable in a counterclockwise direction and restricted from rotating in a clockwise direction viewed from front. Engaging portions 24 are arranged along an outer periphery of the wheel 23. In the embodiment, six engaging portions 24 are arranged along the outer periphery of the wheel 23. A cylindrical shaft member (e.g. a pin) extending in the front-rear direction is used for each of the engaging portions 24. A left portion of the wheel 23 enters the driving passage 3 via a window arranged on a right side of the driving passage 3.

As shown in FIG. 2, each of the engaging portions 24 of the wheel 23 engages a corresponding bottom surface of the rack teeth 15*b* of the driver 15 in the driving passage 3. The wheel 23 is rotatable in the counterclockwise direction in a state where one of the engaging portions 24 engages a corresponding bottom of the rack teeth 15*b*. The driver 15 then moves or returns upward together with the piston 14. The piston 14 moves or returns upward by the lift mechanism 22, thereby increasing a pressure of the gas in the accumulation chamber 13. FIG. 2 shows a state where the driver moves upward to a standby position and is held in the standby position.

Figure 3:
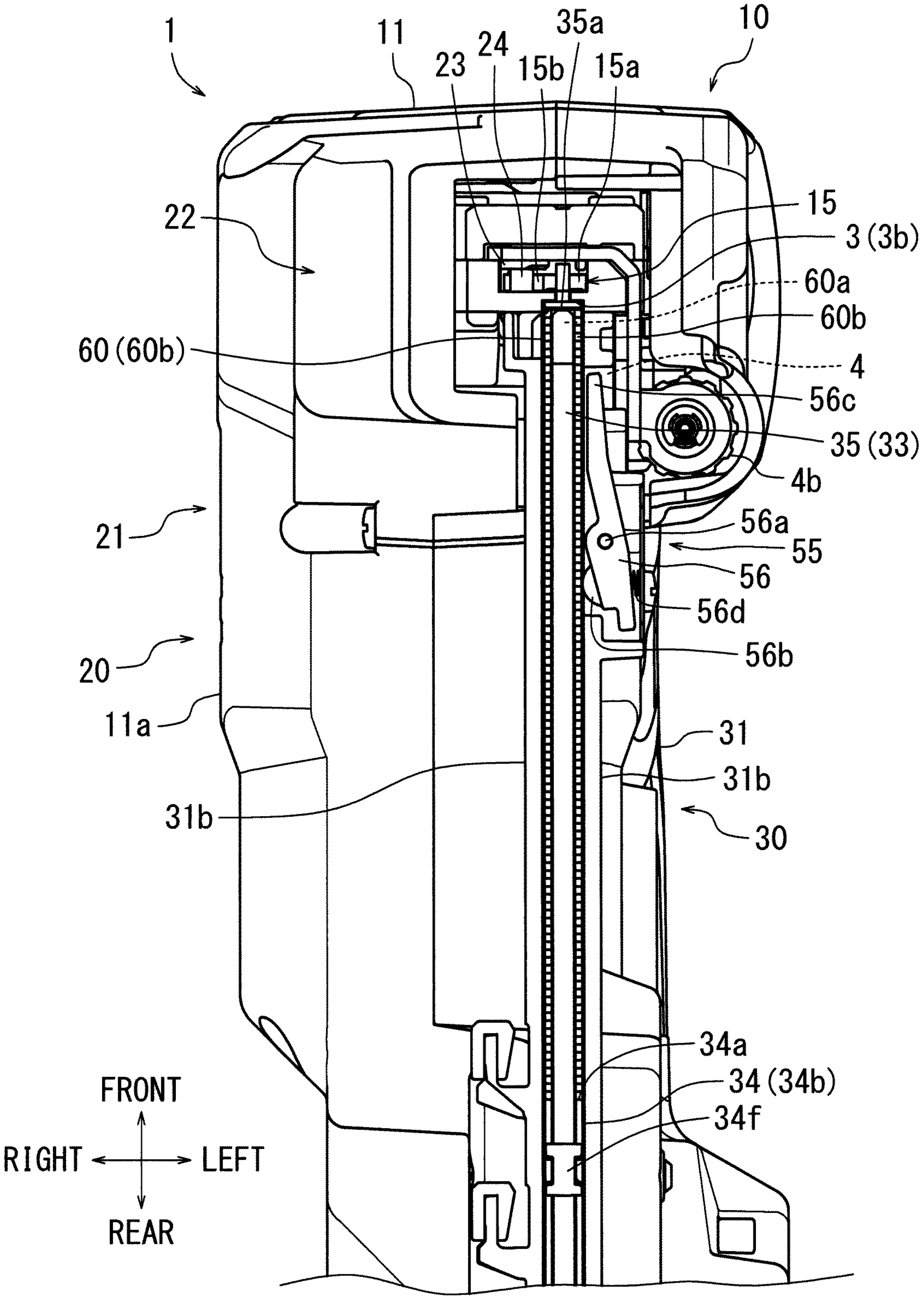
FIG. 3 is a cross-sectional view taken along line III-III of FIG. 1.

As shown in FIGS. 2 and 3, the contact arm 4 extends in the up-down direction on a left side of the driving passage 3. The contact arm 4 is engageable with a stopper 56 on the left side of the magazine 30. The stopper 56 is discussed later in detail. The contact arm 4 is restricted from moving upward by engaging an engaging portion 56*c* of the stopper 56. The contact arm 4 is linked to an adjustment dial 4*b* above the stopper 56. Rotation of the adjustment dial 4*b* adjusts a projecting amount of a tip end 4*a* of the contact arm 4 (refer to FIG. 1) in the up-down direction. A switch 4*c* is arranged above the adjustment dial 4*b*. When the tip end 4*a* of the contact arm 4 is pushed against the workpiece W, the contact arm 4 moves from an off position to an on position. The contact arm 4, then, pushes the switch 4*c* to be turned on. When the switch 4*c* is turned on, a pulling operation of the trigger 6 (refer to FIG. 1) becomes effective. When the contact arm 4 is not pushed against the workpiece W and is at the off position, the switch 4*c* is not turned on. When the switch 4*c* is not turned on, a pulling operation of the trigger 6 is not effective.

Figure 4:
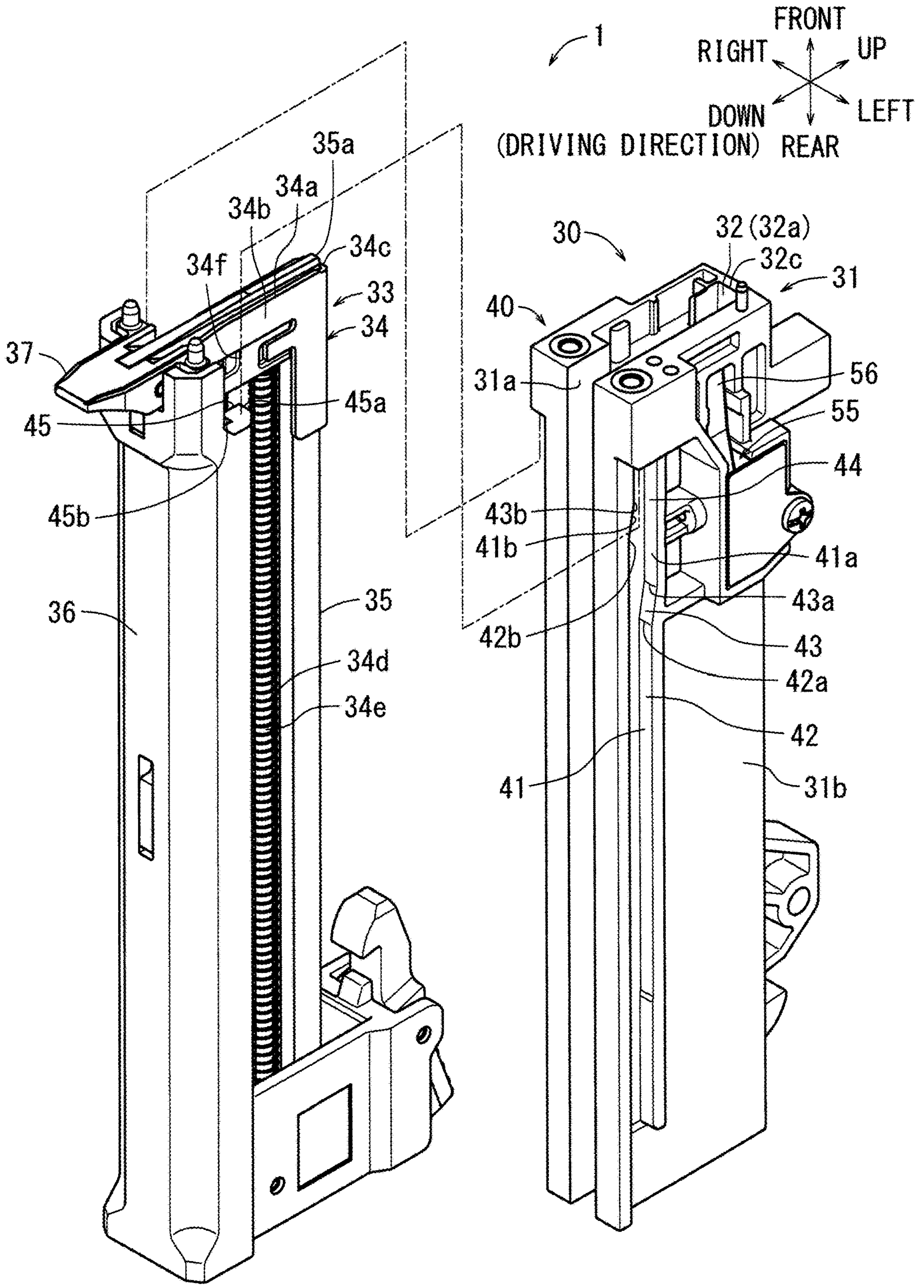
FIG. 4 is an exploded perspective view of a magazine.
Figure 5:
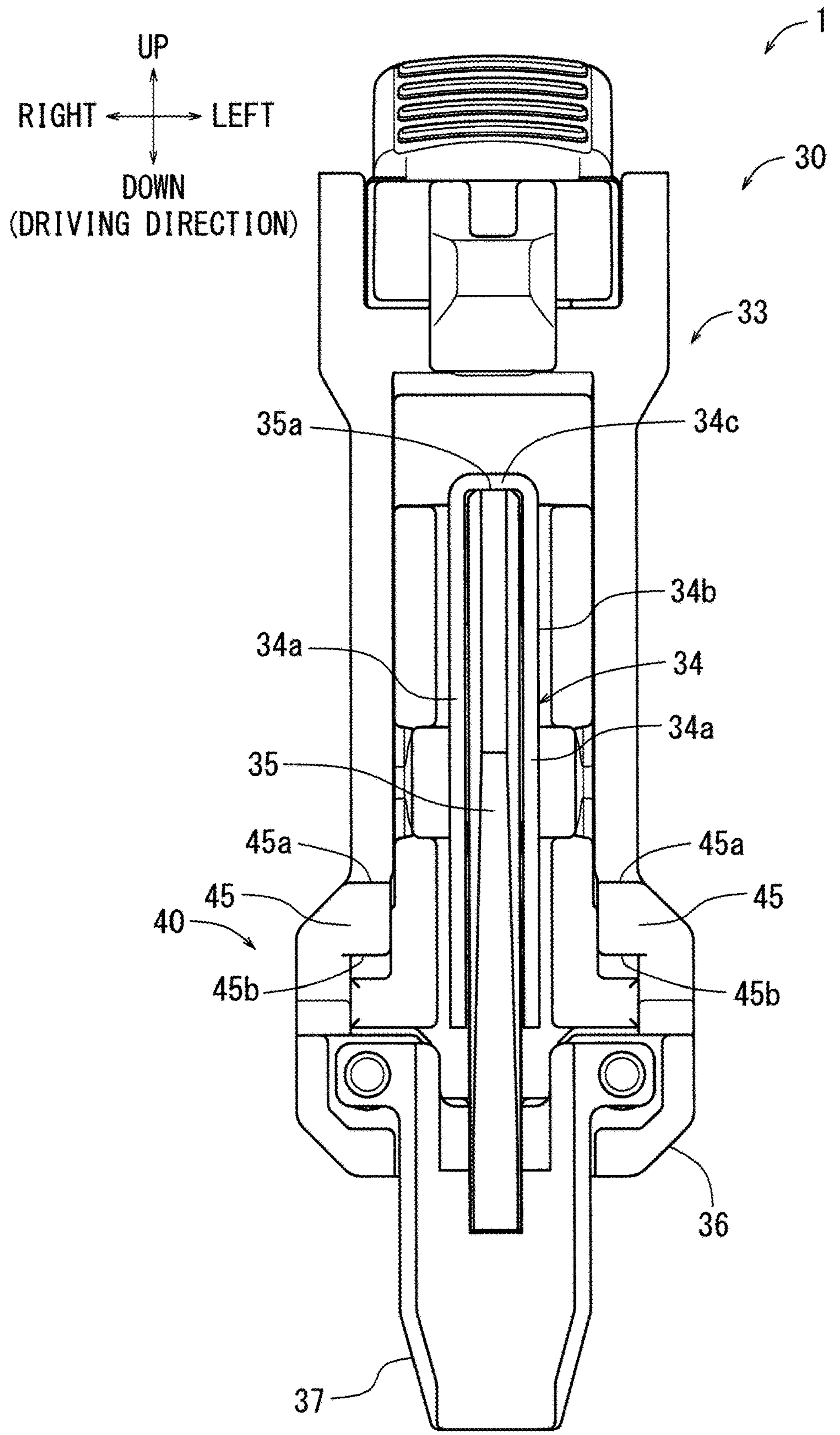
FIG. 5 is a front view of a sub-magazine.

As shown in FIGS. 1, 4 and 8, the magazine 30 includes a main magazine 31 and a sub-magazine 33. The sub-magazine 33 is configured to be slidable with respect to the main magazine 31 in the front-rear direction. The main magazine 31 extends rearward from the driving nose 3. The main magazine 31 houses a plurality of staples 60. A front end of the main magazine 31 is open toward the driving passage 3 and communicates with the driving passage 3. A lower end of the main magazine 31 is provided with an opening 31*a* that is open downward.

As shown in FIGS. 4 and 8, the sub-magazine 33 includes a pusher 34 and a staple guide 35. The pusher 34 is configured to bias the staples 60 from within the main magazine 31 toward a front surface 3*b* of the driving passage 3. The staple guide 35 enters between a pair of legs 60*b* of each staple 60 to hold a posture of the staple 60 in the main magazine 31. The staple guide 35 is a flat-plate-shaped member which is made of, for example, iron. A magazine end 36 is linked to a lower portion of the sub-magazine 33. The magazine end 36 opens and closes the opening 31*a* of the main magazine 31. The magazine end 36 is made of, for example, a synthetic resin. When the sub-magazine 33 moves in the front-rear direction to a closing position M2, the magazine end 36 covers the opening 31*a* of the main magazine 31 from below. A protrusion 37 protruding downward is formed at a front end of the sub magazine 33. The protrusion 37 cooperates with the tool main body 10 to form the driving passage 3 that extends in the up-down direction toward the ejection port 3*a*.

As shown in FIGS. 4 and 8, the main magazine 31 includes a back surface 32 at a front portion thereof. The back surface 32 extends in the front-rear direction and in the left-right direction. The main magazine 31 also includes a pair of side walls 31*b* extending from left and right ends of the back surface 32 in the up-down direction. Accordingly, the main magazine 31 is formed in an approximately U shape when viewed from front. A width of the back surface 32 and the opening 31*a* in the left-right direction is approximately the same as or slightly larger than that of the head 60*a* of the staple 60 in the left right direction. When the driving tool 1 is placed with a lower side thereof directed toward a top side, the opening 31*a* of the main magazine 31 is oriented to the top side and the back surface 32 of the main magazine 31 is oriented to a bottom side. When the driving tool 1 is in this posture, the staples 60 are loaded into the main magazine 31 from the opening 31*a*. Accordingly, when the staples 60 are loaded into the main magazine 31, a bottom surface of the main magazine 31 corresponds to the back surface 32.

As shown in FIG. 8, a lower portion of the back surface 32 extends in parallel to a front-rear direction in which the staple guide 35 moves. A planar-shaped flank relief 32*a* is formed in a front portion of the back surface 32. The flank relief 32*a* is tilted upward as it extends forward. The flank relief 32*a* extends in a plane shape from a start position 32*b* to an end position 32*c*. The start position 32*b* is at a rear portion of the flank relief 32*a* and the end position 32*c* is at a front portion of the flank relief 32*a* in the front-rear direction. The flank relief 32*a* is smoothly linked to a rear portion of the back surface 32 at the start position 32*b*. A length between the start position 32*b* and the end position 32*c* in the up-down direction, in other words, a depth D1 shown in FIG. 8 is, for example, 1 mm.

Figure 11:
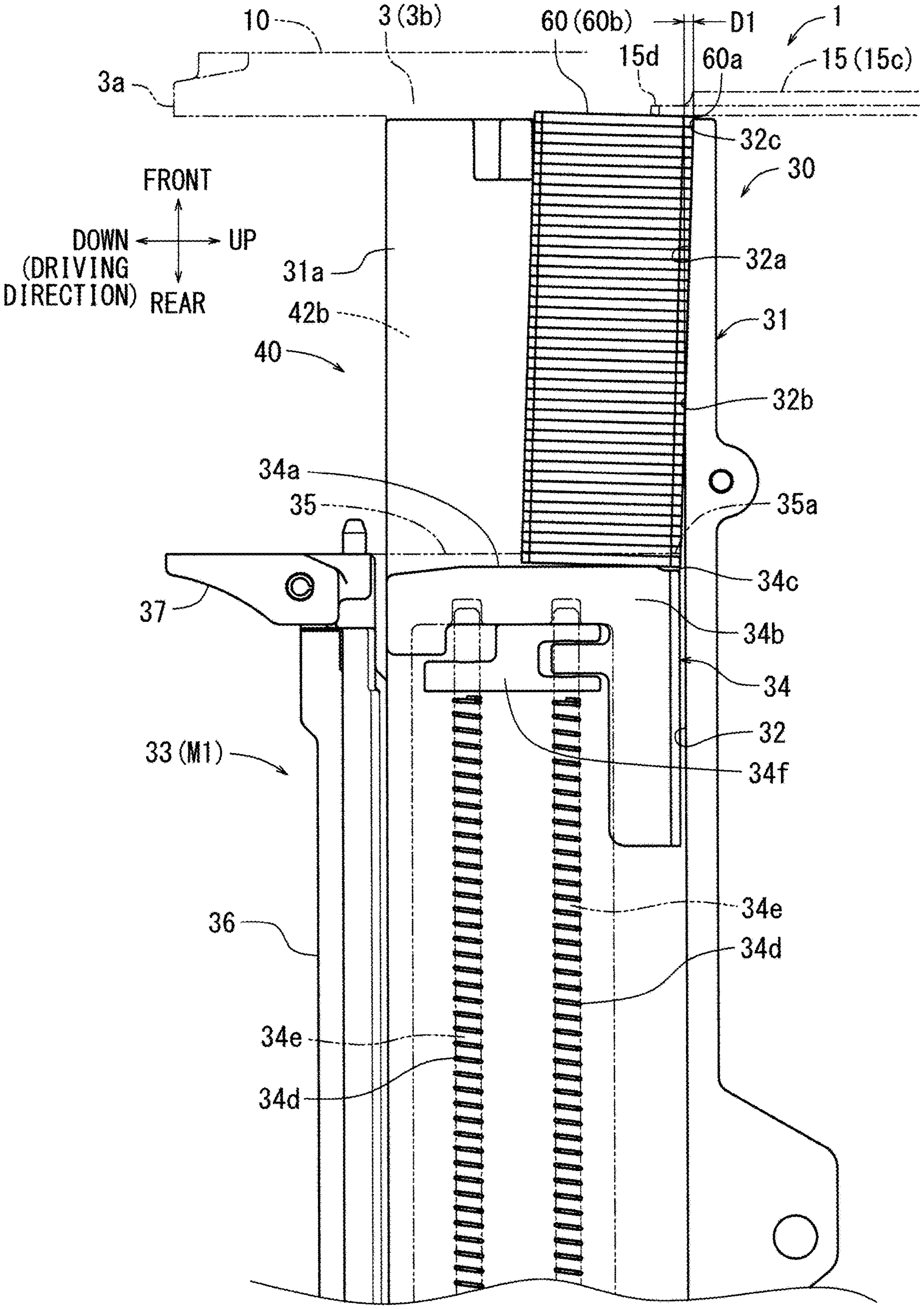
FIG. 11 is a cross-sectional view taken along line XI-XI of FIG. 9.

As shown in FIGS. 4, 8 and 11, a front surface of the staple guide 35 linearly extends in the up-down direction. An upper end of the front surface of the staple guide 35 is a tip end 35*a* that faces the back surface 32 of the main magazine 31 in the up-down direction. As shown in FIG. 11, when the sub-magazine 33 is positioned rearward, in more detail, in an opening position M1, a gap is formed between the tip end 35*a* of the staple guide 35 and the rear portion of the back surface 32. The gap has a length larger than that of the head 60*a* of the staple 60 in the up-down direction.

As shown in FIGS. 4, 8 and 11, the pusher 34 is a U-shaped plate viewed from front. A front surface 34*a* of the pusher 34 is formed in a planer shape extending in the up-down direction. An upper end 34*c* of the front surface 34*a* of the pusher 34 is chamfered to have a tilted surface with regard to the front surface 34*a*.

As shown in FIGS. 4, 8 and 11, a pair of upper and lower shafts 34*e* extending in the front-rear direction are attached to the staple guide 35. A pusher guide 34*f* is attached to the pair of shafts 34*c* so as to be slidable in the front-rear direction. A compression spring 34*d* is provided so as to surround each of the shafts 34*e* in the sub-magazine 33. The compression spring 34*d* biases the pusher guide 34*f* forward. The pusher 34 is formed integrally with the pusher guide 34*f*. Accordingly, the pusher 34 is biased forward so as to be slidable with respect to the staple guide 35 in the front-rear direction. When the pusher 34 does not contact the staple 60 and is biased toward a forefront end of the sub-magazine 33, the front surface 34*a* of the pusher 34 is configured to be positioned slightly behind the tip end 35*a* of the staple guide 35 in the front-rear direction.

Figure 6:
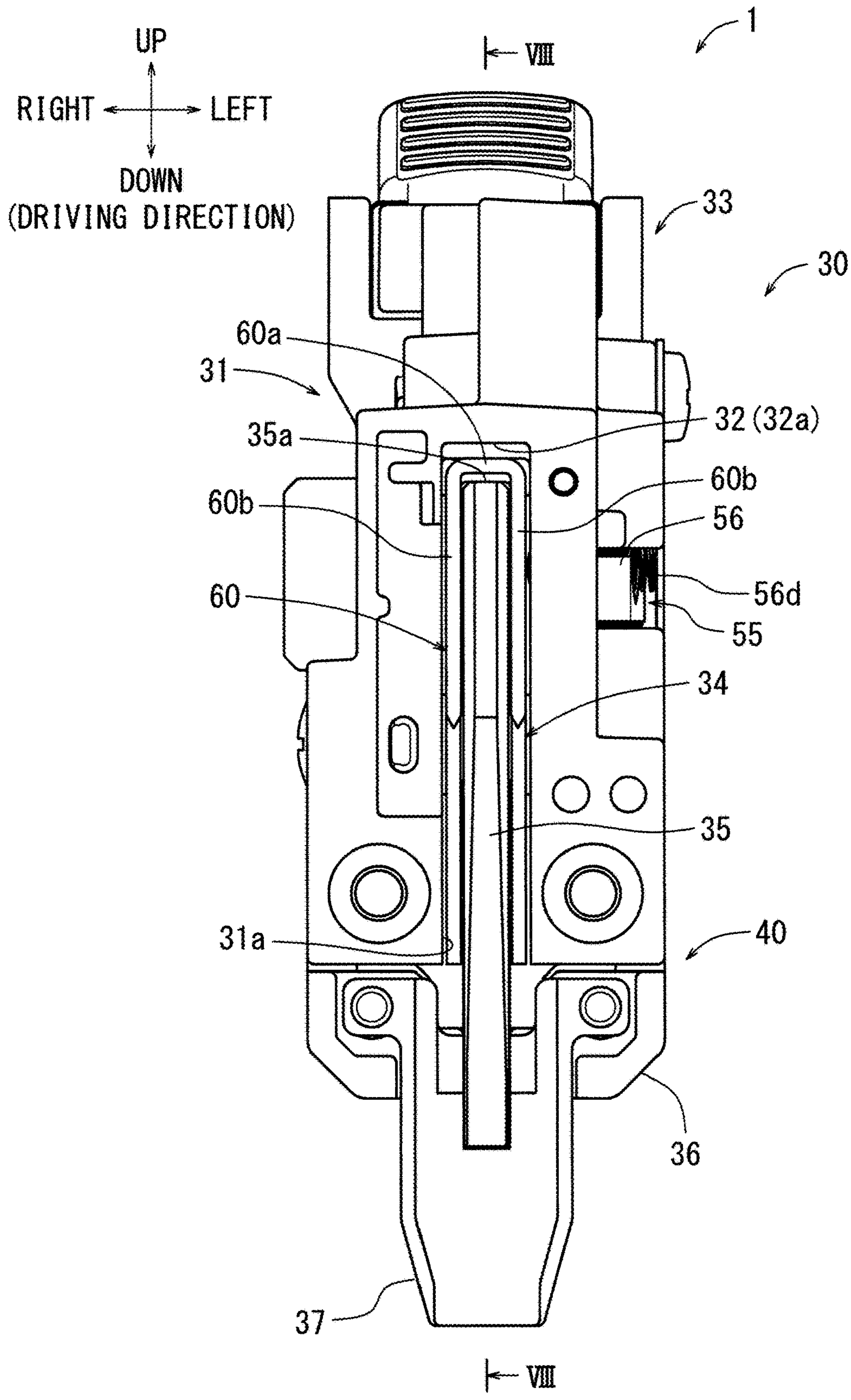
FIG. 6 is a front view of the magazine when the sub-magazine is closed.
Figure 10:
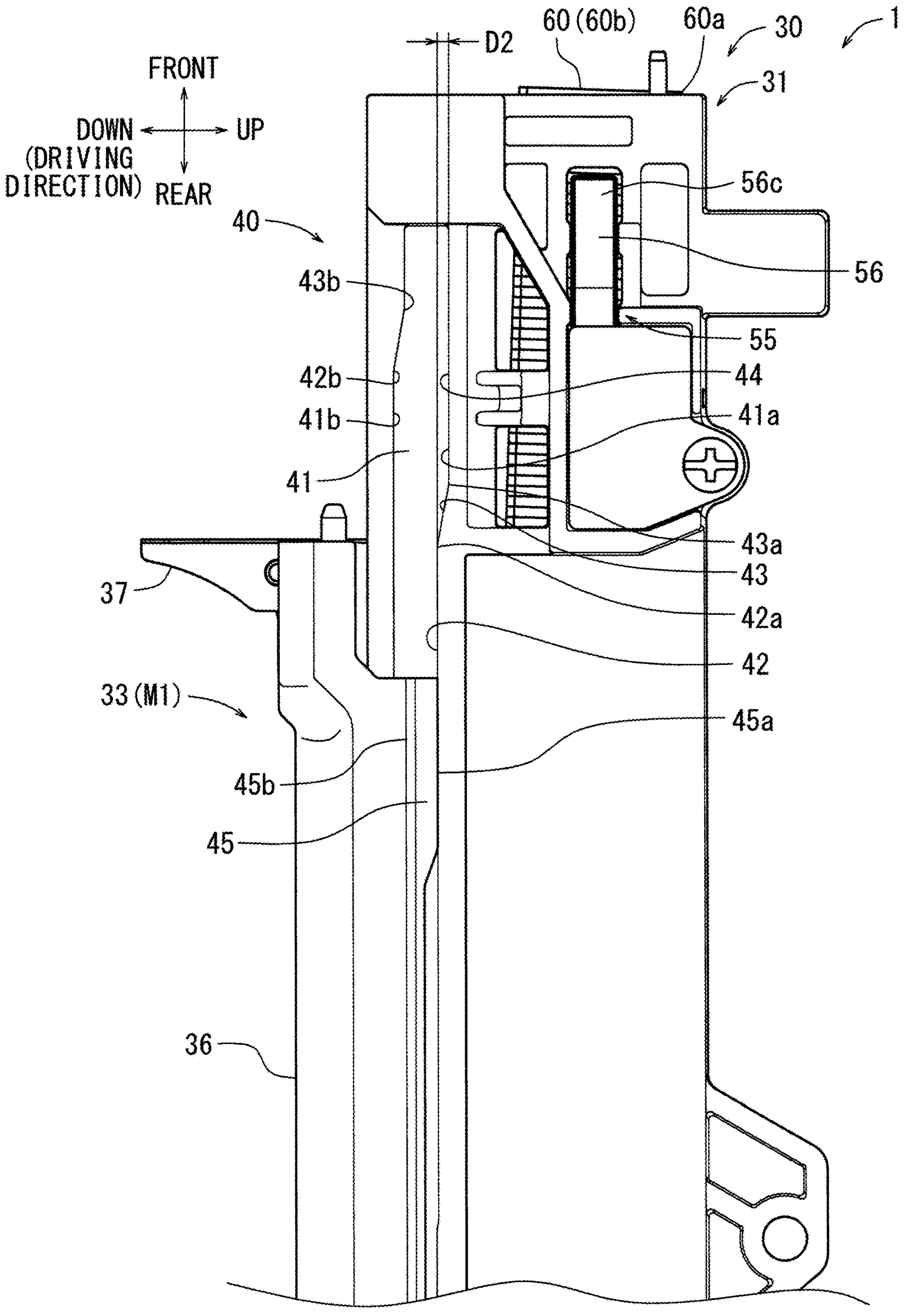
FIG. 10 is a left side view of a part of the magazine when the sub-magazine is open.

As shown in FIGS. 4, 6 and 10, the magazine 30 has a guide mechanism 40 for slidably guiding the magazine end 36 with respect to the main magazine 31 in the front-rear direction. The guide mechanism 40 includes a rail 41 and a rail engaging portion 45. The rail 41 is formed on the side wall 31*b* of the main magazine 31. The rail engaging portion 45 is formed in the magazine end 36. The rail 41 is formed on a lower portion of each of the pair of left and right side walls 31*b*. The rail engaging portion 45 is formed in each of left and right side portions of the magazine end 36 so as to be engageable with a pair of left and right rails 41. Each of the rail engaging portions 45 is formed in approximately a rectangular box shape protruding inwardly from left and right side portions of the magazine end 36, respectively. The rail engaging portion 45 includes an upper end 45*a* and a lower end 45*b*. The upper end 45*a* extends in a planer shape extending in the front-rear direction. The lower end 45*b* extends in a planer shape extending in parallel to the upper end 45*a* in the front-rear direction.

Figure 7:
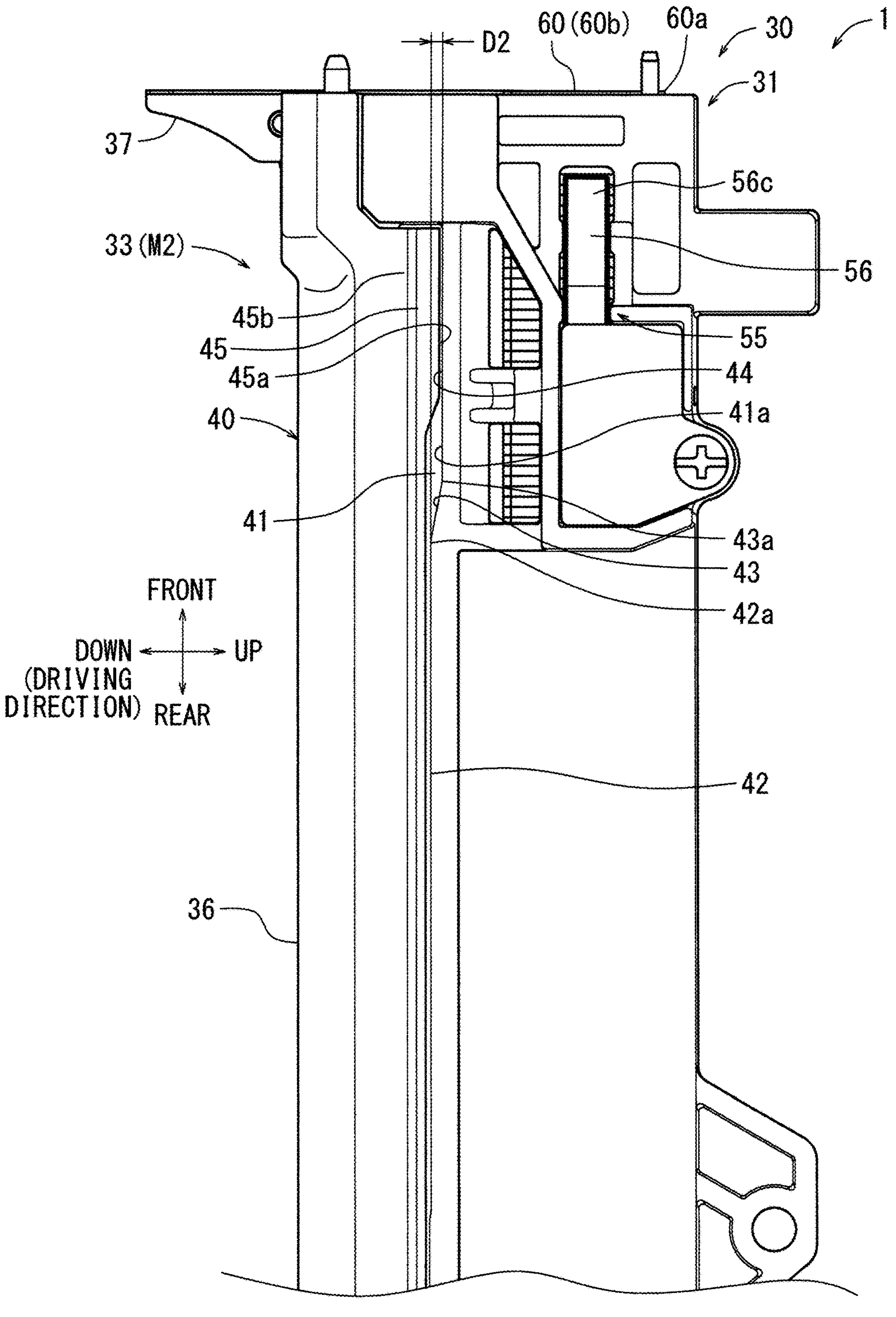
FIG. 7 is a left side view of a part of the magazine when the sub-magazine is closed.

As shown in FIGS. 4, 7 and 10, the rail 41 is formed such that a first rail 42, a second rail 43 and a third rail 44 are connected in this order from a lower portion of the main magazine 31. The rail 41 includes an upper surface 41*a* and a lower surface 41*b*. The upper surface 41*a* slidably engages the upper end 45*a* of the rail engaging portion 45. The lower surface 41*b* slidably engages the lower end 45*b* of the rail engaging portion 45. The first rail 42 linearly extends frontward from a rear portion of the side wall 31*b*. The first rail 42 is connected to the second rail 43 at front ends 42*a*, 42*b* close to the tool main body 10 (refer to FIG. 1). The front end 42*a* is formed on a side of the upper surface 41*a* of the rail 41. The front end 42*b* is formed on a side of the lower surface 41*b* of the rail 41. When the rail engaging portion 45 engages the first rail 42, the sub-magazine is positioned rearward in an opening position M1. In this position, the opening 31*a* of the main magazine 31 is open.

As shown in FIGS. 4, 7 and 10, the second rail 43 is connected to the first rail 42 such that the second rail 43 is tilted with respect to the first rail 42. Also, the second rail 43 is tilted upward toward the tool main body 10 that is located at the front side of the second rail 43 (refer to FIG. 1). The second rail 43 extends linearly. The second rail 43 is connected to the third rail 44 at front ends 43*a*, 43*b* close to the tool main body 10. The front end 43*a* is formed on a side of the upper surface 41*a* of the rail 41. The front end 43*b* is formed on a side of the lower surface 41*b* of the rail 41. The third rail 44 extends linearly in the front-rear direction so as to be in parallel to the first rail 42 above the first rail 42. In other words, the first rail 42 is formed below the third rail 44 that is provided at approximately the same position as in a prior art. The rail engaging portion 45 is movable to the closing position M2 at a front end by being guided by the third rail 44. At the closing position M2, the opening 31*a* of the main magazine 31 is covered by the magazine end 36.

As shown in FIG. 10, a distance D2 in the up-down direction from the front 42*a* to the front end 43*a* or from the front end 42*b* to the front end 43*b* corresponds to a width of the second rail 43 in the up-down direction. The distance D2 is a distance by which the rail engaging portion 45, eventually the magazine end 36 together with the staple guide 35, moves upward in a direction opposite to the driving direction when the sub-magazine 33 moves frontward toward the closing position M2. The distance D2 is configured to be larger than the depth D1 of the flank relief 32*a* in the up-down direction. For example, the distance D2 may be 1.5 mm to 2.0 mm (refer to FIGS. 8 and 11). The lower front end 42*b* at which the first rail 42 is connected to the second rail 43 is a start point at which the rail engaging portion 45, eventually the magazine end 36 together with the staple guide 35, starts being guided when the sub-magazine 33 is slid forward toward the closing position M2.

As shown in FIG. 11, the start position 32*b* located at a rear end of the flank relief 32*a* is positioned farther than the front end 42*b* from the tool main body 10 in the front-rear direction. Because of this configuration, the flank relief 32*a* is tilted upward so as to be far from the tip end 35*a* of the staple guide 35 earlier than an upward movement of the staple guide 35.

As shown in FIG. 3, the driving tool 1 has an idling strike prevention mechanism 55 for preventing an idling strike without striking a staple 60 by the driver 15. The idling strike prevention mechanism 55 restricts an upward movement of the driver 15 by the lift mechanism 22 when a number of remaining staples 60 in the magazine 30 becomes a predetermined number. The idling strike prevention mechanism 55 in the present disclosure is activated, for example, when a number of remaining staples 60 in the magazine becomes seven or less than seven. The idling strike prevention mechanism 55 includes a stopper 56 for restricting an upward movement of the contact arm 4. The stopper 56 is arranged on a left side of the main magazine 31.

As shown in FIG. 3, the stopper 56 extends approximately linearly in the front-rear direction. The stopper 56 is rotatable in the left-right direction around a rotation shaft 56*a* that extends the up-down direction. The rotation shaft 56*a* is arranged on a slightly rear side of a middle of the stopper 56 in the front-rear direction. The stopper 56 includes an engagement portion 56*c* at a front end of the stopper 56. The engagement portion 56*c* engages the contact arm 4 at an off position to restrict an upward movement of the contact arm 4. The stopper 56 includes a contact 56*b* extending rightward behind the rotation shaft 56*a*. The contact 56*b* is formed in a semicircular shape viewed in the up-down direction. A compression spring 56*d* is arranged on a rear side of the rotation shaft 56*a* and on a left side of the contact 56*b*. The compression spring 56*d* biases the stopper 56 in a clockwise direction viewed from below.

As shown in FIG. 3, the contact 56*b* is biased toward the left leg 60*b* of the staple 60 or a left side surface 34*b* of the pusher 34 by the compression spring 56*d*. When the contact 56*b* contacts the left leg 60*b* of the staple 60 or the left side surface 34*b* of the pusher 34, the engagement portion 56*c* is positioned rightward so as not to engage the contact arm 4. When the pusher 34 moves forward of the contact 56*b*, the contact 56*b* enters on a rear side of the pusher 34. Accordingly, the engagement portion 56*c* moves leftward by a biasing force of the compression spring 56*d* to be engageable with the contact arm 4. When the engagement portion 56*c* engages the contact arm 4, the contact arm 4 is restricted from moving upward. Because of this configuration, a pull operation of the trigger 6 (refer to FIG. 1) is not effective, and accordingly the electric motor 20 is not activated. In this manner, for example, when a number of remaining staples 60 in the magazine 30 becomes seven or less than seven, an idling strike of the driver 15 can be prevented.

Next, a series of a driving operation will be explained with reference to FIGS. 2, 3 and 8. In these figures, the driver 15 is in a standby state. The driver 15 at the standby state is held stopped at a standby position slightly below a top dear center. As shown in FIG. 8, a head 60*a* of the staple 60 disposed at the front end of the magazine 31 contacts a rear surface of the driver 15. Accordingly, the head 60*a* of the front end staple 60 is restricted from entering the driving passage 3. However, legs 60*b* of the front end staple 60 is able to enter the driving passage 3. In this state, even if the driver 15 moves downward from the standby position, the driver 15 does not drive the head 60*a* of the staple 60 and the legs 60*b* of the staple 60 only moves rearward toward the main magazine 31. This is because the head 60*a* of the staple 60 has not entered the driving passage 3.

In the standby state, when the contact arm 4 is pushed against a workpiece W to move upward and the trigger 6 is pulled, the electric motor 20 is activated. When the electric motor 20 is activated, the wheel 23 of the lift mechanism 22 rotates. By rotation of the wheel 23, an engaging portion 24 of the wheel 23 that engages a bottom surface of the rack tooth 15*b* at a lowermost end moves the rack tooth 15*b* upward. Because of this, the driver 15 moves upward from the standby position to a top dead center. When the driver 15 moves upward to the top dead center, the head 60*a* of the front end staple 60 enters the driving passage 3 by pushing of the pusher 34.

When the driver 15 is at the top dead center, the engaging portion 24 of the wheel 23 disengages from the bottom surface of the lower most end rack tooth 15*b*. When the engaging portion 24 of the wheel 23 disengages from the bottom surface of the lowermost end rack tooth 15*b*, the driver 15 moves downward owing to a pressure of the gas filled in the accumulation chamber 13 applied to the piston 14. The tip end 15*d* of the driver 15 moves downward in the driving passage 3 to drive the head 60*a* of the staple 60 in the driving passage 15. The wheel 23 continues to rotate while the driver 15 moves downward and after the driver 15 reaches a bottom dead center. When the driver 15 is at the bottom dead center and the wheel 23 rotates by a predetermined rotation angle, one of the engaging portions 24 engages a bottom surface of an uppermost end rack tooth 15*b*. Accordingly, an upward movement of the driver 15 in the direction opposite to the driving direction starts. When one of the engaging portions 24 engages the bottom surface of the lowermost end rack tooth 15*b*, the driver 15 retunes to the standby position. When the driver 15 and eventually the piston 14 returns to the standby position, the electric motor 20 is stopped. The electric motor 20 is stopped by, for example, properly controlling a time period passed from when the electric motor 20 is activated. The driver 15 stays at the standby position. In this manner, a series of the driving operation is completed.

Next, referring to FIGS. 7 to 13, a movement of the sub-magazine 33 from an opening position M1 to a closing position M2 will be explained. When the sub-magazine 33 is in the opening position M1, the rail engaging portion 45 engages the first rail 42 and is slidable with respect to the main magazine 31 in the front-rear direction. Referring to FIG. 11, a gap between the tip end 35*a* of the staple guide 35 and the back surface 32 in the up-down direction is configured to be larger than the length of the head 60*a* of the staple 60 in the up-down direction. The staples 60 are arranged in the main magazine 31 along the back surface 32 of the main magazine 31. Because of this configuration, when the sub-magazine 33 is in the opening position M1, there is a clearance between the tip end 35*a* of the staple guide 35 and the head 60*a* of the staple 60 in the up-down direction. Accordingly, the tip end 35*a* of the staple guide 35 that is moveable in the front-end direction is prevented from interfering with a head 60*a* of the staple 60 disposed at a rear end of the staples 60 in the magazine 31.

When the sub-magazine 33 is slid further forward, the rail engaging portion 45 engages the second rail 43 forward of the front end 42*b* of the first rail 42. The rail engaging portion 45 is guided by the second rail 43 to move forward and upward in the direction opposite to the driving direction. Accordingly, the tip end 35*a* of the staple guide 35 moves upward to approach the head 60*a* of the staple 60. In a case where the tip end 35*a* of the staple guide 35 moves forward of the rear end staple 60, even if the tip end 35*a* of the staple guide 35 approaches the head 60*a* of the staple 60, the tip end 35*a* of the staple guide 35 is configured to be slidable in the front-rear direction without interfering with the head 60*a* of the staple 60.

The flank relief 32*a* tilting upward as it extends forward is formed in a front portion of the back surface 32 of the main magazine 31. Also, the start position 32*b* of the flank relief 32*a* is positioned rearward of the front end 42*b* of the first rail 42 that corresponds to a rear end of the second rail 43. Because of this configuration, the head 60*a* of a rear end staple 60 in the main magazine 31 can be moved upward earlier than when the tip end 35*a* of the staple guide 35 moves upward to approach the head 60*a* of the rear end staple 60. Accordingly, a clearance between the tip end 35*a* of the staple guide 35 and the head 60*a* of the rear end staple 60 can be obtained. Thus, the tip end 35*a* of the staple 35 can be prevented from interfering with the head 60*a* of the rear end staple 60 in the main magazine 31.

For example, as shown in FIG. 11, there is a case where the head 60*a* of the front end staple 60 is restricted from moving into the driving passage 3 because of a presence of the tip end 15*d* of the driver 15. In this case, only the legs 60*b* of the front end staple 60 enters the driving passage 3. The staples 60 close to the driving passage 3 arranged along the flank relief 32*a* of the back surface 32 tilt upward such that each leg 60*b* of the staple 60 is positioned frontward of the head 60*a* of the staple 60. Even in this case, the head 60*a* of the rear end staple 60 can be arranged (released) upward earlier than when the tip end 35*a* of the staple guide 35 moves upward to approach the head 60*a* of the rear end staple 60. Accordingly, a clearance between the tip end 35*a* of the staple guide 35 and the head 60*a* of the rear end staple 60 can be obtained, and thus an interference of the tip end 35*a* of the staple guide 35 with the head 60*a* of the rear end staple 60 can be prevented.

Figure 12:
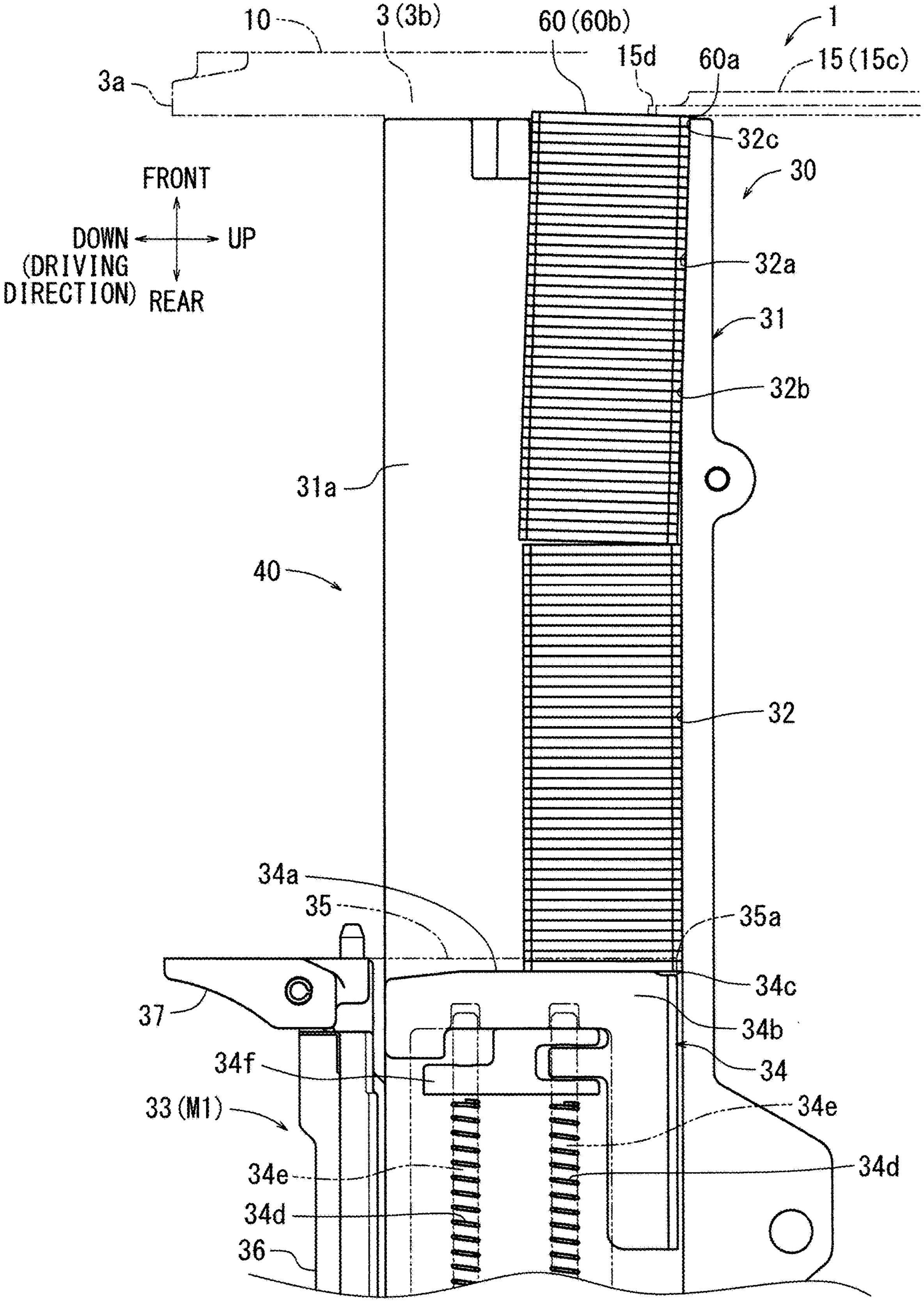
FIG. 12 is a view similar to FIG. 11, illustrating a state where a plurality of staples are further loaded into the magazine.
Figure 13:
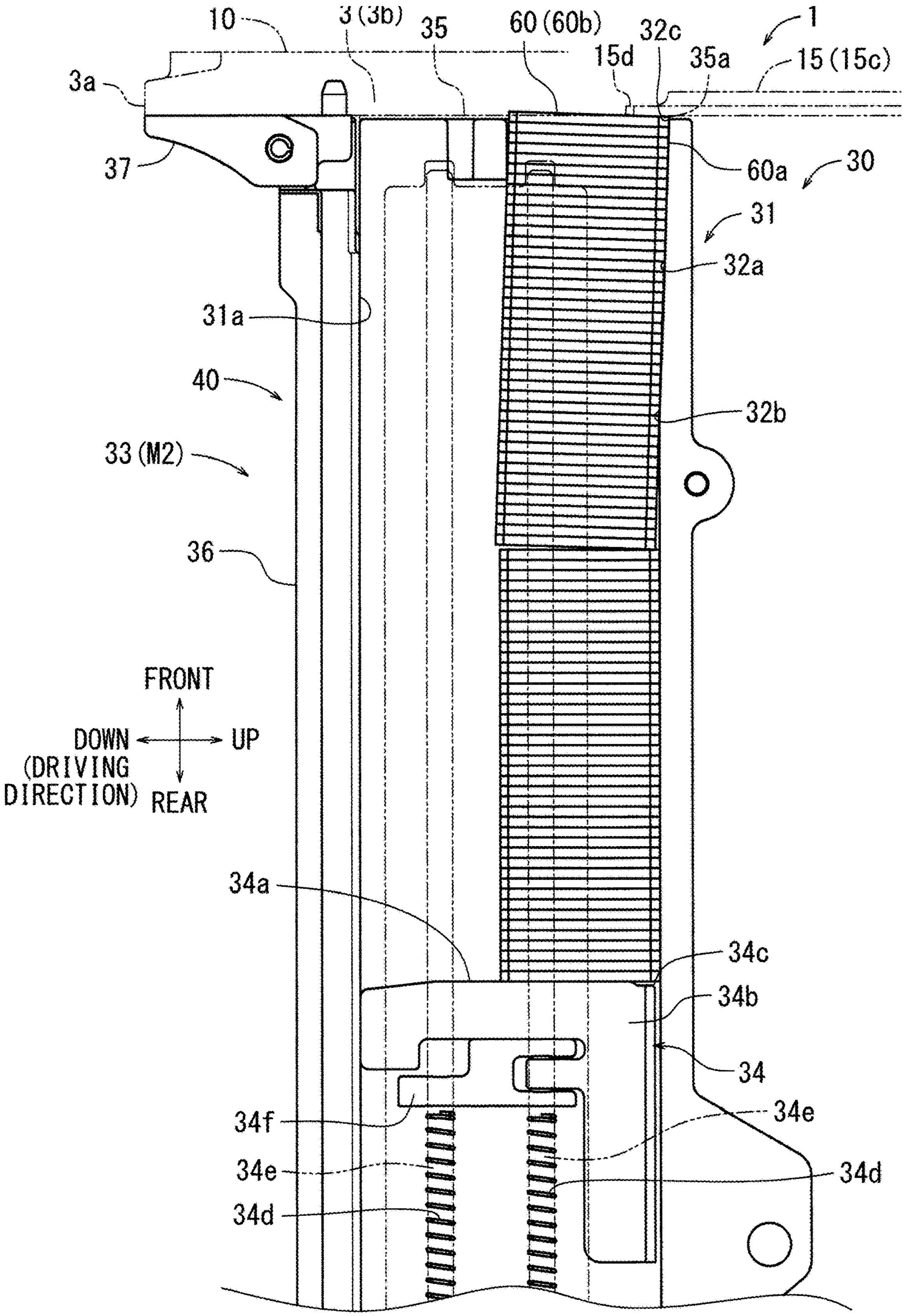
FIG. 13 is a view similar to FIG. 11, illustrating a state where the sub-magazine is moved from a state shown in FIG. 12 to a state when the sub-magazine is closed.

As shown in FIGS. 12 and 13, there is a case where new staples 60 are newly added behind the staples 60 that have been already loaded into the main magazine 31. In this case, it sometimes happens that the newly added staples 60 do not align with the staples 60 that haven been already loaded into the main magazine 31, differently from a case where the staples 60 align in the front-rear direction as shown in FIG. 8. Even in this case, the tip end 35*a* of the staple guide 35 is positioned such that a clearance is made between the tip end 35*a* of the staple guide 35 and the head 60*a* of the rear end staple 60 of the newly added staples 60. Accordingly, an interference of the tip end 35*a* of the staple guide 35 with the head 60*a* of the rear end staple 60 can be prevented.

As discussed above, as shown in FIGS. 2, 7, 8, 10 and 11, the driving tool 1 drives a U-shaped staple 60 having the head 60*a* and the pair of legs 60*b*. The driving tool 1 includes the tool main body 10 including the driver 15 for driving the staple 60. The driving tool 1 includes the main magazine 31 that houses the staples 60 and extends from the tool main body 10. The driving tool 1 includes the pusher 34 for pushing the staples 60 in the main magazine 31 toward the tool main body 10. The driving tool 1 includes the staple guide 35 that is configured to be inserted between the pair of legs 60*b* of the staple 60 in the main magazine 31. The driving tool 1 includes the sub-magazine 33 to which the pusher 34 and the staple guide 35 are attached. The driving tool 1 includes the guide mechanism 40 for guiding the sub-magazine 33 toward the tool main body 10 from the opening position M1 to the closing position M2 with respect to the main magazine 31. Also, the guide mechanism 40 is configured to guide the sub-magazine 33 in a direction opposite to the driving direction while the sub-magazine 33 moves from the opening position M1 to the closing position M2.

Because of these configuration, the staple guide 35 far from the closing position M2 is relatively positioned on a side of the driving direction (a lower side) in comparison to a case where the staple guide 35 is close to the closing position M2. Accordingly, when the sub-magazine 33 is away from the closing position M2, a clearance can be formed between the tip end 35*a* of the staple 35, which is on a side of a direction opposite to the driving direction, and the head 60*a* of the staple 60 in the main magazine 31. Thus, if the staple 60 is slightly tilted in a loading direction, an interference of the staple guide 35 with the head 60*a* of the staple 60 can be prevented. Accordingly, in the guide mechanism 40, the staple guide 35 can be moved to the closing position M3 so as not to interfere with the staple 60. When the sub-magazine 33 is close to the closing position M2, the tip end 35*a* of the staple guide 35, which is on a side of a direction opposite to the driving direction, approaches the head 60*a* of the staple 60 in the main magazine 31. Accordingly, rattling of the staples 60 in the magazine 31 can be reduced by moving the sub-magazine 33 toward the closing position M2.

As shown in FIGS. 4, 7 and 10, the guide mechanism 40 includes a rail 41 on either one of the main magazine 31 and the sub-magazine 33. Also, the guide mechanism 40 includes the rail engaging portion 45 that slidably engages the rail 41. The rail engaging portion 45 is formed on the other one of the main magazine 31 and the sub-magazine 33. Because of this configuration, a movement of the sub-magazine 33 with respect to the main magazine 31 can be properly and reliably guided by the rail 41 and the rail engaging portion 45. When the sub-magazine 33 is in the opening position M1, the staple guide 35 can be reliably guided such that the staple guide 35 is away from the head 60*a* of the staple 60 on a side of the driving direction. When the sub-magazine 33 is at the closing position M2, the staple guide 35 can be reliably guided such that the staple guide 35 approaches the head 60*a* of the staple 60 on a side of the direction opposite to the driving direction. Because of this configuration, when the sub-magazine 33 is closed, an interference of the staple guide 35 with the head 60*a* of the staple 60 can be prevented and also rattling of the staples 60 in the magazine 31 can be reduced.

As shown in FIGS. 4, 7 and 10, the rail 41 includes the first rail 42 extending toward the tool main body 10 (refer to FIG. 1) and the second rail 43 extending from the front end 42*b* of the first rail 42 so as to be tilted in a direction opposite to the driving direction. Because of this configuration, when the rail engaging portion 45 engages the first rail 42 and the sub-magazine 33 is away from the closing position M2, the staple guide 35 is retained so as not to move on a side of the direction opposite to the driving direction, i.e., upward. When the sub-magazine 33 approaches the closing position M2 and the rail engaging portion 45 engages the second rail 43, the staple guide 35 moves on the side of the direction opposite to the driving direction. Accordingly, an interference of the staple guide 35 with the head 60*a* of the staple 60 can be prevented until the sub-magazine 33 moves close to the closing position M2. Because of this configuration, for example, in a case where there are not so many connected staples 60 in the main magazine 31 and the rear end staple 60 farthest from the tool main body 35 is disposed relatively close to the tool main body 10, an interference of the staple guide 35 with the head 60*a* of the staple 60 can be prevented.

As shown in FIGS. 4 and 10, the rail 41 includes the third rail 44 extending from the front end 43*b* of the second rail 43 toward the tool main body 10 (refer to FIG. 1) so as to be tilted relative to the second rail 43 and parallel to the first rail 42. Because of this configuration, while the rail engaging portion 45 engages the third rail 44, the staple guide 35 moves parallel to a feeding direction of the staples 60. Also, when the rail engaging portion 45 engages the second rail 43, the staple guide 35 approaches the head 60*a* of the staple 60. Accordingly, while the sub-magazine 33 moves toward the closing position M2 (refer to FIG. 7), the staple guide 35 can be guided smoothly toward the tool main body 10 with rattling of the staple 60 being reduced.

As shown in FIGS. 8 and 11, the main magazine 31 includes the back surface 32 configured to face the heads 60*a* of the staples 60 in the magazine 31. The back surface 32 includes the flank relief 32*a* configured to be formed on a side of the tool main body 10 and to form a clearance between the flank relief 32*a* and the sub-magazine 33 in the driving direction. Accordingly, even in a case where there are not so many connected staples 60 in the main magazine 31 or in a case where the staples 60 are tilted in the main magazine 31, a clearance can be made between the head 60*a* of the staple 60 and the staple guide 35 which moves close to the closing position M2, owing to the presence of the flank relief 32*a* of the back surface 32. Accordingly, the sub-magazine 33 can be smoothly moved to the closing position M2.

As shown in FIGS. 8 and 11, the flank relief 32*a* is a flat surface that is tilted in the direction opposite to the driving direction as the flank relief 32*a* approaches the tool main body 10. Because of this configuration, the staple guide 35 moves in a direction opposite to the driving direction (i.e. upward) when the staple guide 35 moves toward the closing position M2. By aligning a tilting direction of the flank relief 32*a* with a moving direction of the staple guide 35 in the up-down direction, a clearance between the staple guide 35 and the head 60*a* of the staple 60 can be obtained. Thus, the sub-magazine 33 can be reliably moved to the closing position M2.

As shown in FIGS. 8 and 11, the main magazine 31 includes the rail 41 (refer to FIG. 10). The flank relief 32*a* extends toward the tool main body 10 from the start position 32*b* that is positioned farther than the front end 42*b* of the first rail 42 (refer to FIG. 10) from the tool main body 10 in the front-rear direction. Because of this configuration, when the sub-magazine 33 moves to the closing position M2, the staple guide 35 approaches the head 60*a* of the staple 60 in a direction opposite to the driving direction. The flank relief 32*b* forms a clearance by which the staples 60 are directed in a direction opposite to the driving direction earlier than an upward movement of the staple guide 35 toward the head 60*a* of the staple 60. Accordingly, an interference of the staple guide 35 with the head 60*a* of the staple 60 can be prevented during a period when the sub-magazine 33 moves to the closing position M2.

As shown in FIGS. 8 and 11, the depth of D1 of the flank relief 32*a* in the driving direction is configured to be smaller than the moving distance D2 (refer to FIGS. 7 and 10) of the sub-magazine 33 of the guide mechanism 40 in the driving direction. Because of this configuration, a clearance between the staple guide 35 and the head 60*a* of the staple 60 is gradually reduced as the sub-magazine 33 moves toward the closing position M2. Accordingly, when the sub-magazine 33 moves to the closing position M2, rattling of the staples 60 in the main magazine 31 can be reduced.

As shown in FIGS. 4, 8 and 11, the pusher 34 is positioned in the sub-magazine 33 so as to be farther from the tool main body 10 than the tip end 35*a* of the staple guide 35*a* in the front-rear direction. Because of this configuration, when the sub-magazine 33 moves to the closing position M2, the staple guide 35 enters between the pair of legs 60*b* before the pusher 34 contacts the staple 60. Accordingly, for example, if the staple 60 is tilted by being pushed by the pusher 34, the tip end 35*a* of the staple guide 35 has already been positioned so as not to interfere with the head 60*a* of the staple 60. Thus, an interference of the staple guide 35 with the head 60*a* of the staple 60 can be prevented.

As shown in FIG. 11, when the driver 15 is at the standby position, each of the staples 60 in the main magazine 31 is arranged to be tilted so as to approach the driving passage 3 of the tool main body 10 as extending from the head 60*a* to the tip end of the leg 60*b*. Because of this configuration, the heads 60*a* of the staples 60*a* arranged in the main magazine 31 in the front-rear direction are tilted in a direction opposite to the driving direction (i.e., upward) as the staples 60 approach the tool main body 10. Accordingly, with regard to the staples 60 that are tilted in the main magazine 31, a clearance can be obtained between the staple guide 35 and the head 60*a* of the staple 60 for preventing an interference of the staple guide 35 with the head 60*a* of the staple 60.

The driving tool 1 according to the above-discussed embodiment may be modified in various ways. In the above-exemplified embodiment, a so-called gas-spring type driving tool 1 is exemplified. Instead, a mechanical-spring type driving tool, a flywheel-type driving tool, or a compressed-air type driving tool in which compressed air supplied from outside is used as a driving force of the driver 15, may be applied to the present disclosure.

In the above-discussed embodiment, the rail 41 and the rail engaging portion 45 which are engageable with each other are exemplified as the guide mechanism 40. Instead, a movement of the sub-magazine 33 may be guided by, for example, a biasing force of biasing members. In the above-discussed embodiment, the rail 41 is formed in the main magazine 31 and the rail engaging portion 45 is formed in the magazine end 36. Instead, the rail engaging portion 45 may be formed in the main magazine 31 and the rail 41 may be formed in the magazine end 36.

In the above-discussed embodiment, the staple guide 35 made of iron is exemplified. Instead, the staple guide 35 may be made of, for example, synthetic resin. The position of the front end 42*b* from which the second rail 43 extends or the start position 32*b* which corresponds to the rear end of the flank relief 32*a* in the back surface 32 may be modified according to a remaining number of the staples 60 in the main magazine 31 when the idling strike prevention mechanism 55 is activated.

We claim:

1. A driving tool, comprising:

a tool main body including a driver configured to drive a U-shaped staple in a driving direction, the U-shaped staple having a head and a pair of legs;

a main magazine that is configured to house a plurality of staples and extends from the tool main body;

a pusher configured to push the plurality of staples in the main magazine toward the tool main body;

a staple guide inserted between the pair of legs of the staple in the main magazine;

a sub-magazine to which the pusher and the staple guide are attachable; and a guide mechanism configured to guide the sub-magazine toward the tool main body from an opening position to a closing position with respect to the main magazine, the guide mechanism further configured to guide the sub-magazine in a direction opposite to the driving direction while the sub-magazine moves from the opening position to the closing position.

2. The driving tool according to claim 1, wherein the guide mechanism includes (i) a rail formed on one of the main magazine and the sub-magazine, and (ii) a rail engaging portion that is slidably engageable with the rail, the rail engaging portion being formed on the other one of the main magazine and the sub-magazine.

3. The driving tool according to claim 2, wherein the rail includes (i) a first rail linearly extending toward the tool main body, and (ii) a second rail extending from an end of the first rail so as to be tilted in the direction opposite to the driving direction.

4. The driving tool according to claim 3, wherein the rail further includes a third rail extending from an end of the second rail toward the tool main body so as to be tilted relative to the second rail and parallel to the first rail.

5. The driving tool according to claim 4, wherein the rail includes an upper surface and a lower surface parallel to the driving direction, each of the upper surface and the lower surface of the rail including the first, second and third rail, respectively.

6. The driving tool according to claim 3, wherein the main magazine includes a back surface configured to face the heads of the plurality of staples in the main magazine, the back surface including a flank relief formed on a side of the tool main body forming a clearance between the sub-magazine and the flank relief in the driving direction.

7. The driving tool according to claim 6, wherein the flank relief is a flat surface that is tilted in the direction opposite to the driving direction as the flank relief approaches the tool main body.

8. The driving tool according to claim 6, wherein:

the main magazine further includes the rail; and the flank relief extends from a start position to the tool main body, the start position being positioned remotely from the tool main body that is farther than the end of the first rail.

9. The driving tool according to claim 6, wherein the flank relief has a less depth in the driving direction smaller than a moving distance of the sub-magazine of the guide mechanism in the driving direction.

10. The driving tool according to claim 2, wherein the rail engaging portion includes an upper end and a lower end in the driving direction.

11. The driving tool according to claim 10, wherein the upper end of the rail engaging portion extends in a planer shape in a direction perpendicular to the driving direction.

12. The driving tool according to claim 11, wherein the lower end of the rail engaging portion extends in a planer shape in a direction parallel to the upper end of the rail engaging portion.

13. The driving tool according to claim 12, wherein the rail engaging portion is formed in approximately a rectangular box shape.

14. The driving tool according to claim 12, wherein the upper end and the lower end of the rail engaging portion are slidably engageable with the upper surface and the lower surface of the rail, respectively.

15. The driving tool according to claim 14, wherein the rail and the rail engaging portion are respectively formed in a pair in a direction perpendicular to the driving direction and a sliding direction in which each engaging portion slides relative to a corresponding rail.

16. The driving tool according to claim 1, wherein the pusher is positioned in the sub-magazine so as to be farther from the tool main body than a tip end of the staple guide.

17. The driving tool according to claim 1, wherein each of the plurality of staples in the main magazine is arranged to be tilted so as to approach a driving passage of the tool main body as extending from the head to the pair of legs when the driver is at a standby position.

18. The driving tool according to claim 1, further comprising:

a shaft attached to the staple guide and extending in a direction perpendicular to the driving direction, a pusher guide integrally formed with the pusher and slidably attached to the shaft; and a compression spring surrounding the shaft and biasing the pusher guide toward the tool main body.

19. The driving tool according to claim 1, wherein the pusher is a U-shaped plate viewed in a direction perpendicular to the driving direction.

20. The driving tool according to claim 1, wherein an end of the pusher on a side of the tool main body is chamfered in a direction opposite to the driving direction.

* * * * *